B. KRÄMER.
CONTROLLING MECHANISM FOR INTERNAL COMBUSTION ENGINES.
APPLICATION FILED FEB. 10, 1913.

1,153,629.

Patented Sept. 14, 1915.
6 SHEETS—SHEET 1.

Witnesses:

Inventor,
Bernhard Krämer,
by Albert G. Davis
Att'y.

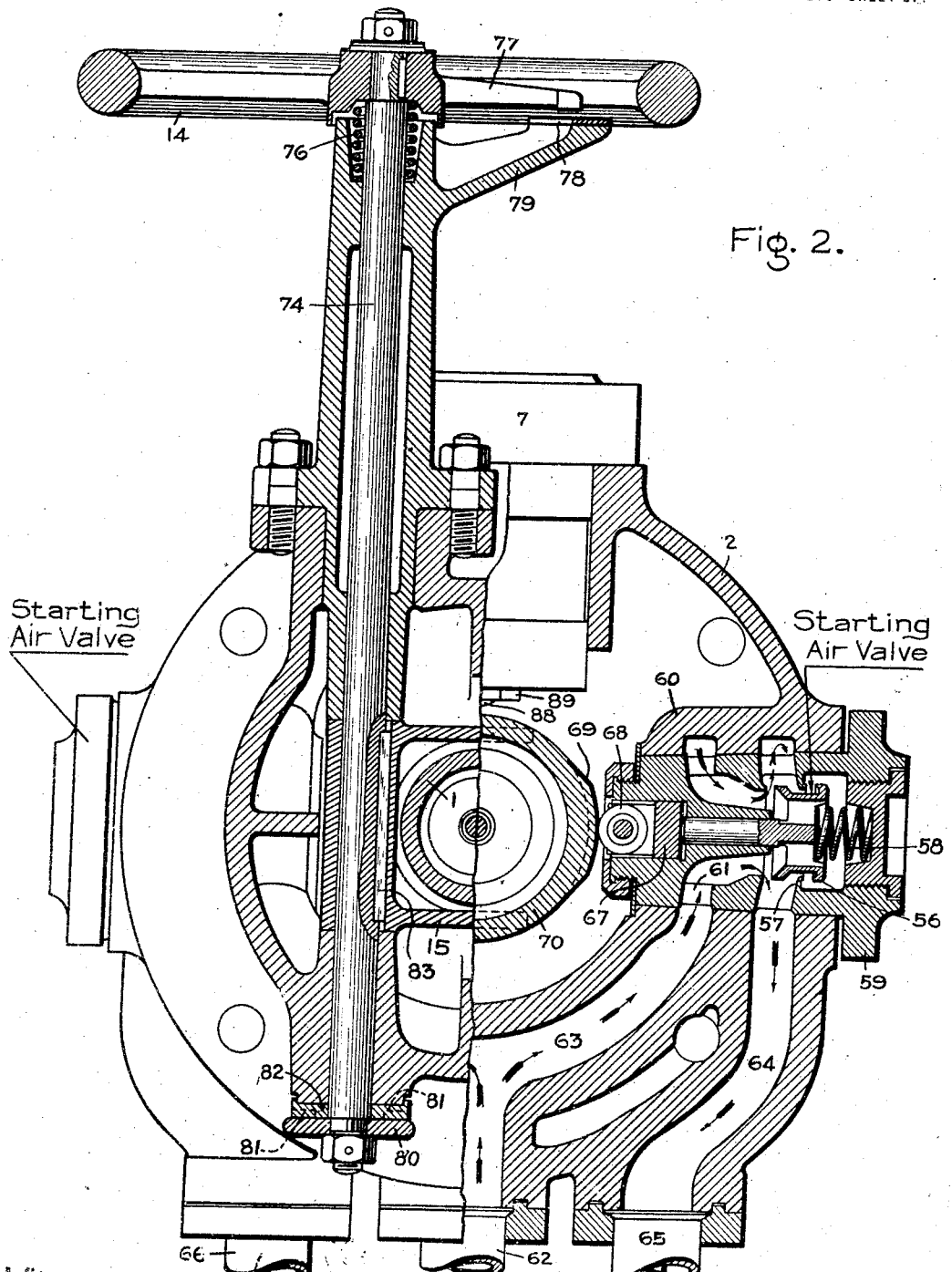

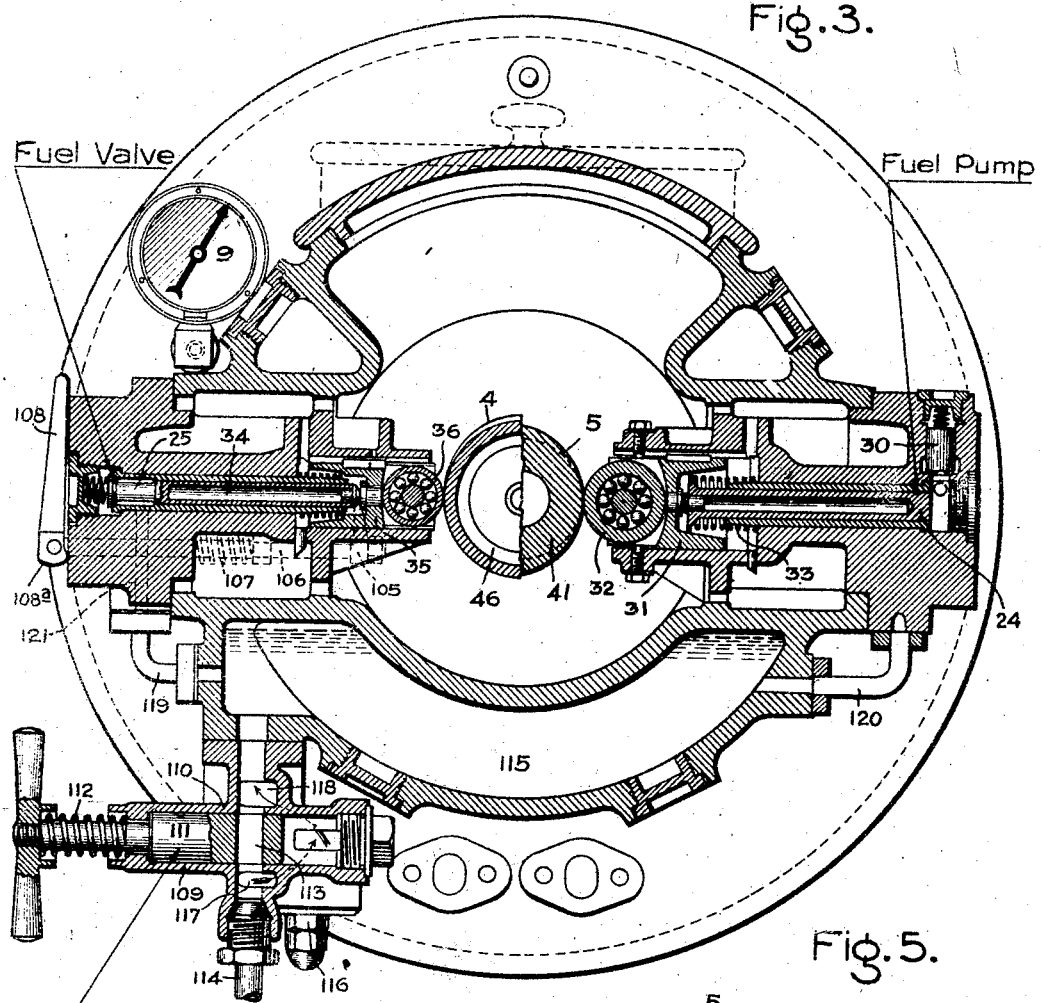
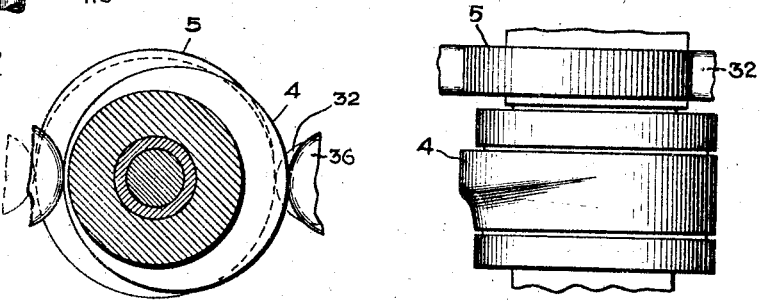
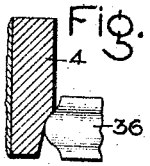

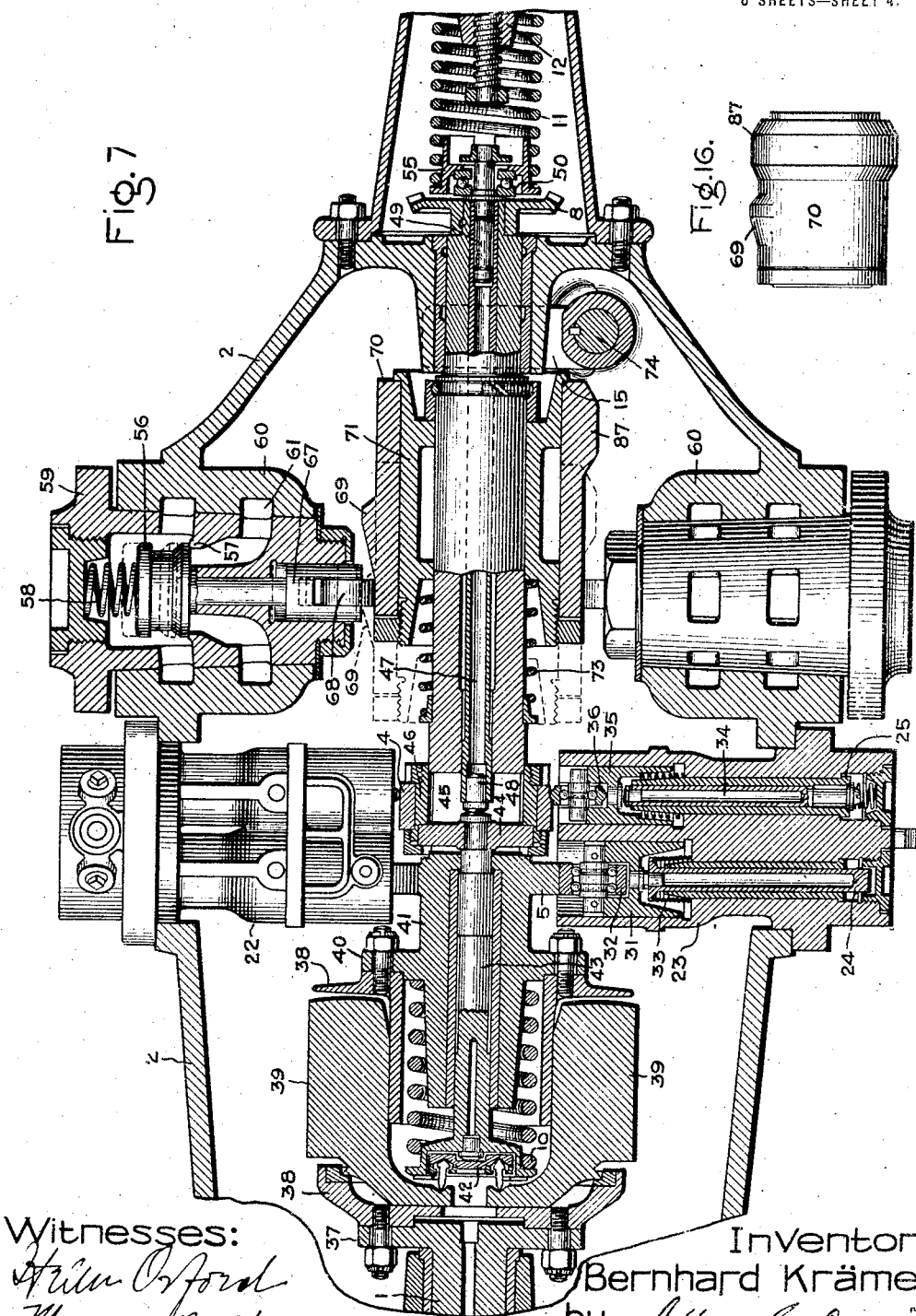

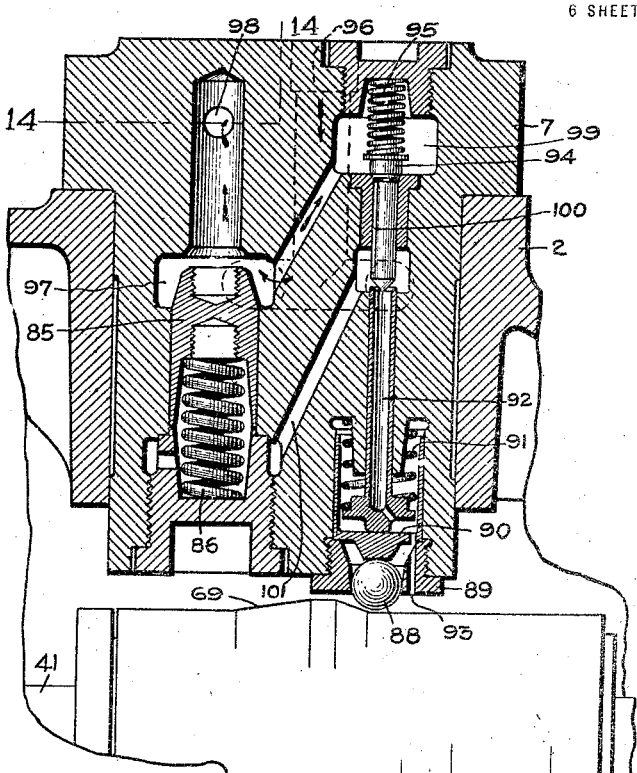
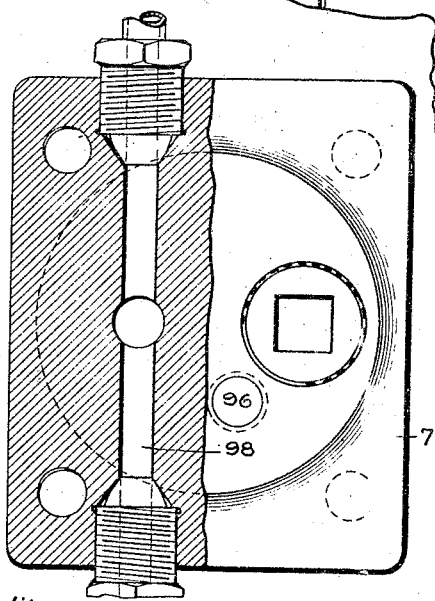
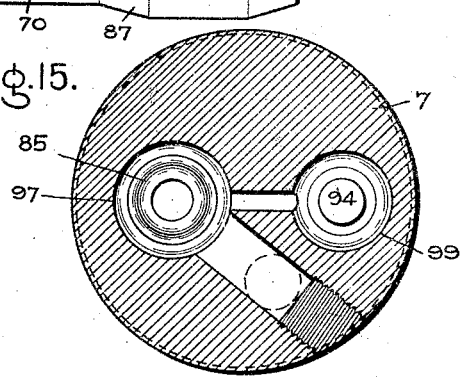

UNITED STATES PATENT OFFICE.

BERNHARD KRÄMER, OF CHARLOTTENBURG, GERMANY, ASSIGNOR TO GENERAL ELECTRIC COMPANY, A CORPORATION OF NEW YORK.

CONTROLLING MECHANISM FOR INTERNAL-COMBUSTION ENGINES.

1,153,629.  Specification of Letters Patent. Patented Sept. 14, 1915.

Application filed February 10, 1913. Serial No. 747,401.

*To all whom it may concern:*

Be it known that I, BERNHARD KRÄMER, a subject of the Emperor of Germany, residing at Charlottenburg, Germany, have invented certain new and useful Improvements in Controlling Mechanism for Internal-Combustion Engines, of which the following is a specification.

In the operation of internal combustion engines of the high compression type it is necessary to provide a starting means, such as fluid under pressure, subject to the control of suitable valve means; to provide a means for preventing the blast air used for injecting fuel into the cylinder from acting during the starting period; to pump fuel under relatively high pressure to the injector or pulverizer preparatory to its admission to the cylinder or cylinders and to regulate the action of the fuel pump or pumps. If the best results are to be obtained these various means or devices should be so organized and arranged that they can be incorporated in the same structure and so related that they may be operated in the proper sequence, thereby eliminating mistakes of the operator in so far as possible. In this connection it is to be borne in mind that fluids under high pressure are being utilized, and that a mistake on the part of the operator may have serious results.

My invention has for its object to provide an improved governing mechanism for such engines which will fulfil the exacting requirements above outlined.

For a consideration of what I believe to be novel and my invention, attention is directed to the accompanying description and the claims appended thereto.

Figure 1:
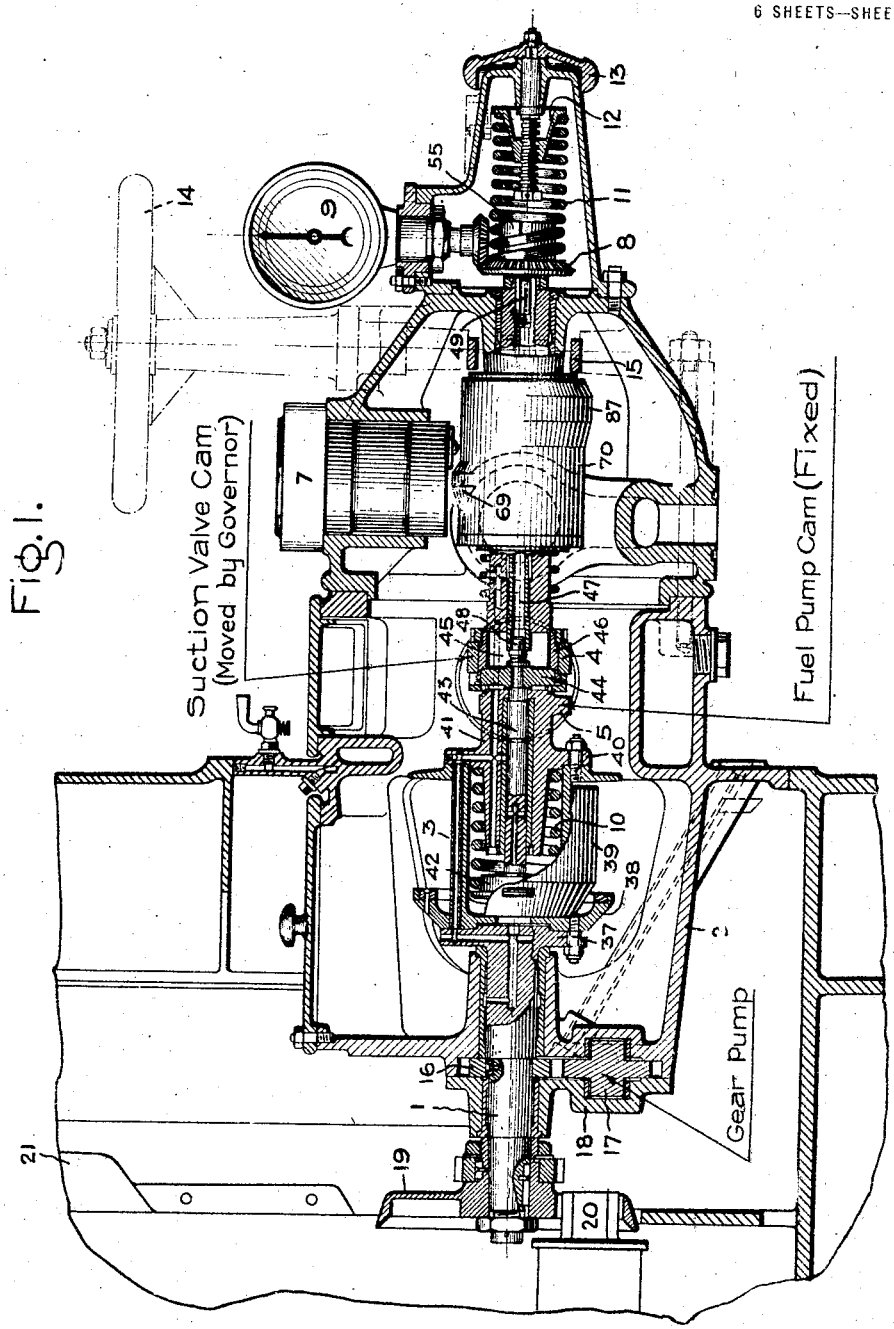
Figure 8:
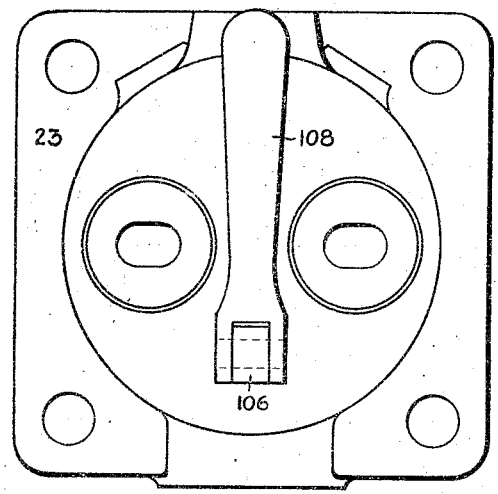
Figure 9:
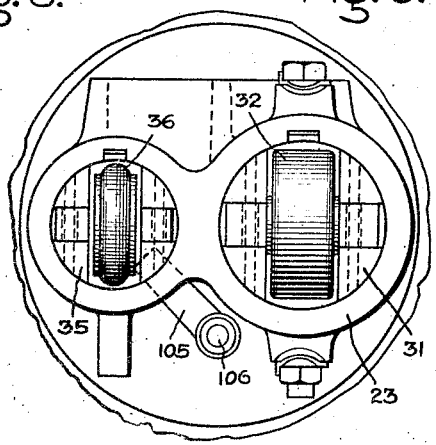
Figure 10:
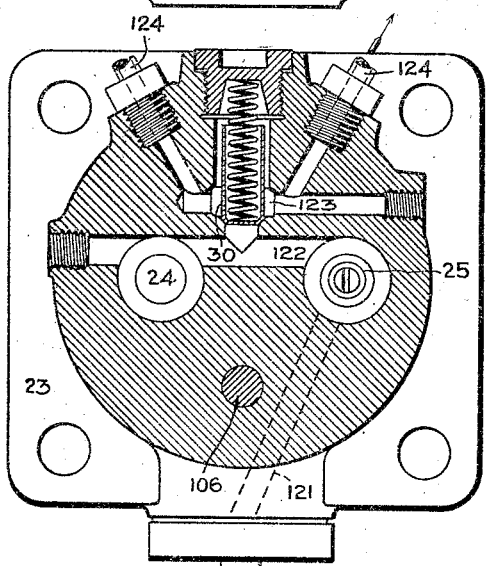
Figure 11:
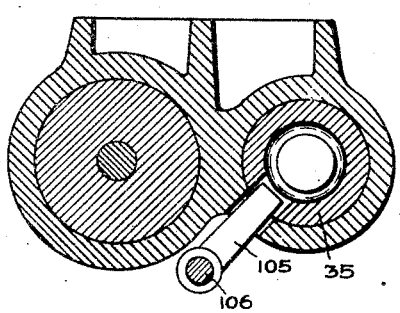
Figure 12:
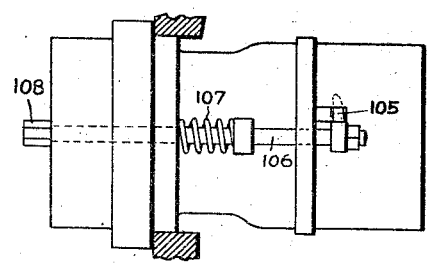

In the accompanying drawings which are illustrative of my invention, Figure 1 is a longitudinal section of my improved engine controlling mechanism; Fig. 2 is a cross-section through the air starting valve; Fig. 3 is a cross-section of the pump mechanism; Fig. 4 is a detail view of the pump cam; Fig. 5 is a detail plan view of a part of the cam shaft; Fig. 6 is a detail view showing the formation of the suction valve cam and its coöperating roller; Fig. 7 is an enlarged sectional view taken in the plane of the shaft and showing the relation between the pumps, air starting valves and actuating cams therefor; Figs. 8, 9 and 10 are detail views illustrating the pump; Figs. 11 and 12 illustrate a means for positively holding the suction valve of the pump off of its seat; Figs. 13, 14 and 15 are detail views showing the shut-off valve for the blast air, and Fig. 16 is a cam of modified shape for controlling the action of the shut-off valve for the blast air.

In carrying out the invention, a shaft 1, Fig. 1, is provided that is mounted in suitable bearings that are supported by the housing 2. This housing in addition to supporting the shaft acts as a support for the pump and the valve casings, as will appear more fully hereafter. Mounted on the shaft is a speed governor 3 of any suitable construction. The movable abutment of the governor is connected to the cam 4 in such a manner as to move it axially on the shaft. This cam controls the open and closed periods of the suction valves of the fuel pumps, as will appear more fully hereafter. The fuel pumps are driven by a cam 5 which is rotated by and at the same speed as the shaft 1 and whose position is fixed. Mounted on the shaft is a cylindrical member or carrier 70 having two cam faces, one coöperating with the air starting valves and the other coöperating with the shut-off valve for blast air which is contained in the casing 7, the latter being supported by the upper side of the housing. On the right hand end of the cam shaft is a beveled gear 8 that meshes with a similar gear, the latter driving the shaft of the tachometer 9. The weights of the governor are opposed by the spring 10 located between them and also by the coiled compression spring 11 that is located at one end of the shaft and provided with an adjusting nut 12 that may be moved by the handle 13. In order to permit the shaft to turn without turning the spring 11 a ball thrust bearing is inserted between the parts which will be described more fully herein-after in connection with Fig. 7. As before stated the action of the pumps is controlled by the governor through the axial shifting of cam 4. The action of the air starting valves and the shut-off valve for the blast air is controlled by the member 6 and its cams. This member is moved axially on the shaft by means of a hand wheel 14 and a fork 15 actuated thereby. When the parts are in the position shown the air starting valves and also the shut-off valve for the blast air are out of operation, this being the normal position.

Mounted on the left hand end of the shaft is a gear 16 that meshes with a gear 17 to form a pump, said pump being arranged to supply lubricant to various parts of the apparatus. The pump is located in a chamber formed partly by the end wall of the housing 2 and by a removable cover 18 attached to the housing. Mounted on the extreme left hand end of the shaft is a disk 19 containing a radial slot to receive the crank pin 20 that is driven by the main shaft of the engine or by any suitable member thereof. The crank pin 20 is slightly flattened on its sides and the slot in the disk is somewhat longer than is necessary to receive the pin, the object being to eliminate troubles due to lack of alinement, also to facilitate the removal of the shaft 1 and its associated parts. In this connection it should be noted that the housing 2 and all of the parts carried thereby can be removed as an entirety from the engine, the frame of which is indicated at 21. This engine may be of any suitable construction.

My invention has been designed for use in connection with a two-cycle internal combustion engine, each cylinder having oppositely moving pistons and will be described in connection therewith. It is to be understood, however, that instead of operating on the two-cycle plan, it may operate on four-cycle or any other plan by suitably modifying and timing the cams.

Referring to Fig. 7, 2 indicates the housing as before, and 22 and 23 the removable pump casings that are bolted to the housing. Each of these casings contains a plunger 24 and a suction valve 25 and a discharge valve 30, Figs. 3 and 10. Each casing is also provided with a cross-head 31 located in a counter bore that is concentric with a cylindrical bore containing the plunger. The cross-head carries a roller 32 which is supported on its pivot by a ball bearing. The pump plunger 24 is made hollow to decrease its weight and is snugly fitted into a surrounding sleeve which makes a tight fit in the casing. The plunger is moved on its discharge stroke by the cam 5 and on its suction stroke by the coiled compression spring 33 located between the shoulder of the casing and the head carried by the plunger.

The suction valve 25 is moved by a lifter 34 which in turn is actuated by a cross-head 35, similar in construction to the pump cross-head but smaller. The cross-head carries a roller 36 which has a rounded face as best shown in Fig. 6, Sheet 3, to facilitate its passage from one part of the cam 4 to another. Briefly stated, the cam 4 has a high portion and a low portion arranged in spiral form and as the cam is shifted under the roller the latter travels on the incline from the high to low portion and vice versa.

By placing the pump casings 22 and 23 on opposite sides of the shaft I am able to utilize a single cam for actuating both plungers, also to use a single cam for controlling both suction valves, assuming that the pumps are out of phase by 180°. That is to say, when the plunger in casing 22 is at the end of its suction stroke the plunger in casing 23 is at the end of its discharge stroke. The suction valves are also out of phase by the same amount, and whether they are closed or opened depends upon the position of their controlling cam 4.

Referring to the construction of the speed governor, Fig. 7, and to the means for shifting the suction valve cam, 1 indicates the shaft which is provided with a head 37 attached to a frame 38 that forms a support for the weights 39 which are carried on knife edged bearings. To the right hand end of the frame is connected an annular flange 40 on the shaft 41 that forms a continuation of, and in effect is the same as the shaft 1. The governor weights transmit motion to the movable abutment 42 against the action of the coiled compression spring 10. The abutment is connected to an axially arranged rod 43 to which is attached a cross piece 44 located in a slot 45 in the shaft 41. This cross piece is rotated by the shaft, along with the speed governor, but is free to move back and forth in the slot in response to speed changes. Surrounding the shaft is a sliding ring 46 that is provided with two end nuts that engage the cam 4 on opposite sides and hold the same in fixed position to the cross piece 44. The right hand part of the shaft 1 is hollow and located therein is a tube 47 that carries a plug 48 which engages a corresponding plug carried by the cross piece 44. The opposed meeting faces of these plugs are rounded to prevent cramping. In the right hand end of the tube 47 is a plug 49 that forms a seat for the ball bearing 50. Engaging the ball bearing is a tubular member 55 forming a seat for the coiled compression spring 11, the tension of which is adjusted by the nut 12. The spring 11 coöperates with the spring 10 to oppose the action of the governor weights 39 and also serves as a means for moving the cross piece 44 and the suction valve cam to the left or full load position. Moving the fuel valve cam to the right decreases the supply of fuel by causing the suction valve lifters 34 to hold the suction valves off of their seats for a longer or shorter period of each working stroke of the pump plungers.

In order to start a high compression engine it is necessary to rotate its shaft by some source of extraneous power. In the present case the engine is intended to be started by air under high pressure. In order to control the admission of this air to the cylinders, air starting valves 56 are provided. In the present embodiment of the invention two of these valves are provided, but a greater or less number can be used, depending upon the requirements. The valves are similar in construction and a description of one of them will be sufficient. 56 indicates the valve and 57 a flat seat therefor, which valve is normally held in a closed position by the coiled compression spring 58. The valve and its seat are carried by a removable casing 59 that is seated in a boss 60 formed on the housing 2. The valve casing and the boss are provided with registering ports 61 through which air under high pressure flows from a suitable storage tank to the cylinders. The arrangement of the air passages is best shown in Fig. 2, Sheet 2, wherein 62 indicates a pipe leading from a storage tank to the cored passage or chamber 63 in the housing. This chamber supplies air to both of the starting valves in multiple. After the air passes the starting valve it flows through the passage 64 to the pipe 65, the latter leading to one of the cylinders of the engine. From the other starting valve air passes by the pipe 66 to another cylinder of the engine. Each valve is actuated by a cross-head 67, which carries a roller 68 arranged to engage a cam 69 mounted on the tubular carrier 70. Under normal conditions the cam 69 is inactive, that is to say it rotates in a plane which is displaced laterally from the axis of the air valves. This is best shown in Fig. 7 wherein the full lines indicate the normal running position and the dotted lines the starting position.

A means for moving the cam 69 into and out of operation, which is common to both starting valves, will now be described. The carrier 70 for the cam is mounted on a holder 71, and the latter is arranged to be moved to and fro on the shaft by means of a forked lever 15. A coiled compression spring 73 acts to move the holder 71 to the right as indicated in Fig. 7.

Referring now to Fig. 2, Sheet 2, 74 indicates a vertically disposed spindle which is situated slightly to one side of the shaft 1. This shaft is located in bearings supported by the housing 2. On the upper end of the shaft is a hand wheel 14 by means of which it can be depressed and also moved angularly. A spring 76 is provided which normally holds the handle in its raised position, as shown. 77 indicates a pointer carried by the hand wheel. This pointer is arranged to be moved over a dial plate 78 carried by a projection 79 of the housing. By comparing the position of the pointer 77 with suitable datum points on the dial the operator can determine the position of the cam carrying element 70 of Fig. 7. In order to insure proper positions of the element 70 and its cams the lower end of the spindle 74 is provided with a locking device comprising a plate 80 having a square opening for the spindle and a series of projections 81 shown in dotted lines Fig. 2, which register with notches formed in a locking plate 82 which is fastened to the housing. By depressing the spindle 74 the projections can be disengaged from the notches, after which the spindle 74 may be turned in a clockwise or anti-clockwise direction to move the cam carrying element 70 through the forked lever 15, the latter being secured against rotation on the spindle by the spline 83. This spline or feather permits the spindle to be moved up and down within the forked lever but prevents relative angular movement of the parts, said forked lever being held between fixed shoulders located above and below it.

In an apparatus of this kind it is necessary to prevent the introduction of fuel to the engine cylinders during the starting operation in order to prevent a succession of fuel charges being delivered to the cylinders previous to a firing operation. In other words, fuel must not be introduced into the cylinder until the engine has acquired sufficient momentum to compress the pure air in the cylinder to a temperature above the igniting temperature of the fuel, since otherwise there might be an accumulation of fuel in the cylinder which might lead to disastrous results on the first firing stroke after the starting operation. In an engine of the character referred to the fuel is introduced by a blast of air when the needle valve is opened, said air blast having a pressure superior to that due to a compression. It therefore follows, if the supply of blast air can be controlled by a means independent of the needle valve admitting fuel to the engine, that no fuel will be admitted, even though the fuel valve is opened by the normal fuel valve operating means. This result is attained by the arrangement shown in Figs. 13 to 15, Sheet 6, wherein 7 indicates a valve casing that is mounted in a suitable opening formed in the housing 2. As shown this casing is located on the upper side of the shaft 41 and is displaced by 90° from the air starting valves.

85 indicates a valve which is open during the normal operation of the engine and is closed during the starting operation. The valve is opened by the air blast pressure and closed by the spring 86. The valve is controlled by the following means:—Mounted on the element 70 is a cam 87 that is adapted to engage the ball 88 which is held between the walls of a screw threaded plug 89. This ball is arranged to elevate the cup shaped holder 90 which is normally held in the position shown by the coiled compression spring 91. Preferably the parts are so constructed and adjusted that during the normal operation the ball 88 is held just out of contact with the cam carrying element 70 so as to reduce wear. Located inside of the cup shaped holder 90 is a tubular actuator 92 which has a small opening in its lower end that communicates with an opening 93 in the plug to permit the escape of air. Above the tubular actuator is a double seated pilot valve 94 that is normally pressed against its upper seat by the spring 95. Air under high pressure enters the valve casing by the passage 96 and flows through the chamber 97 to the passage 98 leading to a pulverizer in an engine cylinder. Assuming that it is desired to start the engine and cut off the supply of blast air to the fuel pulverizers or injectors in the engine cylinders, the cam 87 is shifted to the left by the hand wheel 14, which raises the actuator 92. This cuts off the escape of air under the valve 85 through the engagement of the conical lower end of the valve 94 and the actuator 92, and at the same time raises the valve 94 so that high pressure air can flow from the chamber 97 to the chamber 99, thence through the passage 100 to the diagonal passage 101, which in turn communicates through suitable passages with the under side of the valve 85, thereby balancing said valve as to fluid pressures and permitting the spring 86 to close it and shut off the passage of high pressure air from the inlet passage 96 to the outlet passage 98 leading to the fuel pulverizer.

I may so arrange the parts that the valve 85 opens and closes once for each revolution of the shaft 41 by extending the cam 87 part way around the shaft, or I may so arrange it that during the entire starting operation the valve 85 is held closed by making the cam 87 extend entirely around the shaft as shown in Fig. 16, Sheet 4.

In an apparatus of this character it is at times desirable to cut one of the fuel pumps out of operation. The simplest way to accomplish this is to raise the suction valve of the pump that is to be cut out to a point where it is lifted out of the path of the suction valve cam. Referring to Figs. 8, 9, 11 and 12 of Sheet 5, 105 indicates a dog or finger that is arranged to enter a slot formed in the cross-head 35 that moves the suction valve lifter. This dog is mounted on a spindle 106 which is normally pressed inward by the coiled compression spring 107, Fig. 12. The outer end of the spindle 106 is connected to a handle 108 which is provided with a cam face 108ª, Fig. 3, Sheet 3, so that when the handle is swung outwardly away from the valve casing to a position about 90° from that shown the rod 106 will be moved to the left carrying with it a valve actuator 34 to raise the suction valve 25 from its seat. When in this position the handle is self-locking and the fuel valve will be held from its seat and the pump plunger will on each stroke draw in a charge of fuel through the suction valve and return it through said valve on the discharge stroke.

Previous to starting the engine it is desirable to fill the reservoir and passages or pipes leading to the pumps with fuel to prevent failure or partial failure of the pumps. To this end a hand pump 109, Fig. 3, Sheet 3, is provided. This pump comprises a cylinder 110 and a plunger 111. The plunger is normally held in the position shown by a coiled compression spring 112. In the plunger is a port 113 through which fuel flows from the pipe 114, the latter being connected to a suitable source of supply. Fuel from the pipe 114 enters the reservoir 115 that is formed by coring out the housing. Situated to the right of the fuel inlet pipe is a valve 116 that controls the passage of fluid from the port 117 to the chamber 118. In operating the hand pump, the operator pushes in the plunger against the action of the spring 112, the pump cylinder being filled with fuel from the pipe 114. The first part of the movement of the plunger shuts off the port 113 and therefore fuel is forced from the cylinder through the passage connecting it to the chamber 118 as shown by the arrow, the valve 116 preventing the return of fuel to the pipe 114. A few strokes of the pump will generally suffice to fill the reservoir 115. Fuel from the reservoir is conveyed to the suction valve of the pumps by the pipes 119 and 120, the former leading to one pump and the latter to the second pump. The arrangement of the pipe 119 and the connecting passage 121 leading to a suction valve 25 is best shown in Fig. 10, Sheet 5. In the latter figure the fluid discharged by the plunger 24 enters a horizontal passage 122 from which it passes through the discharge valve 30 into the chamber 123. This chamber may be connected to one or more pipes 124 leading to the pulverizer or injector in an engine cylinder. One pump may supply one cylinder or it may supply a greater number. In this case I have shown the pump as arranged to supply two cylinders by the pipes 124. I prefer, however, to provide a pump for each cylinder in which case a plug would be substituted for one of the pipes.

From the foregoing it will be seen that the pumps, valves therefor, starting valves, and the shut-off valve for the air blast are all mounted in a single casing where they can be properly alined. Also that one shaft suffices to rotate all of the necessary cams for actuating the valves. Also that the speed governor is located on the driving shaft and in close proximity to the cam which it moves, thereby eliminating long connections with many joints. By locating the speed governor on the pump shaft it is fully protected from injury and it and its associated parts may be thoroughly lubricated. Further by arranging the pumps, starting valves and blast air valve in the manner shown said parts can be readily removed for inspection or repair and readily remounted in place without the alinement being disturbed. By reason of the form of connection used between the crank pin 20 and the shaft 1 the housing and its contained parts can readily be removed from the engine frame and returned to place without disturbing any of the parts of the engine proper. This is a very great advantage because it is necessary from time to time to examine these parts. The saving in time required in such operation is particularly important where the engine has to be kept in service practically all of the time, as is the case in power stations furnishing current for lighting and power purposes.

I do not claim herein the specific construction of the speed governor for the reason that it forms the subject matter of my pending U. S. application for patent Serial No. 668,141, filed December 27, 1911.

I do not claim herein certain of the features of the pump construction for the reason that they form the subject matter of my application for U. S. Patent, Serial No. 747,402, filed February 10, 1913.

In accordance with the provisions of the patent statutes, I have described the principle of operation of my invention, together with the apparatus which I now consider to represent the best embodiment thereof; but I desire to have it understood that the apparatus shown is only illustrative, and that the invention can be carried out by other means.

What I claim as new and desire to secure by Letters Patent of the United States is:—

1. In an engine controlling mechanism, the combination of a rotating member, a fuel pump driven by the member, valve means actuated by the member for controlling the pump, means actuated by the member during the starting period for cutting off the air blast used to inject fuel into the engine, a starting valve means actuated by the member, and means for varying the action of the member on the pump valve means and on the starting valve means.

2. In an engine controlling mechanism, the combination of a rotating member, a fuel pump driven by the member, a valve controlling the pump, an actuator for the valve, a valve active during the starting period for cutting off the air blast used to inject fuel into the engine, a starting means, said valves and actuator being moved by the member, and means for varying the effective action of said member on the valves and actuator.

3. In an engine controlling mechanism, the combination of a rotating member, a pump driven by the member, a valve controlling the pump, a valve active during the starting period for cutting off the blast air used to inject fuel into the engine, a starting valve, and cams driven by the member for actuating the valves.

4. In an engine controlling mechanism, the combination of a rotating member, a fuel pump driven by the member, a controlling valve for the pump, a valve active during the starting period for controlling the blast air used to inject fuel into the engine, a starting means, cams driven by the member for actuating the pump valve and said starting means, a speed governor for adjusting one of the cams to vary the action of the pump valve, and a means for adjusting another of the cams to regulate the action of the starting means.

5. In an engine controlling mechanism, the combination of a means supplying fuel to the engine, means for starting the engine, a valve independent of the engine valves for controlling the blast air used to inject fuel into the engine, a shaft that actuates the starting means, and means actuated by the shaft for shutting the blast air valve when the starting means is in operation.

6. In an engine controlling mechanism, the combination of a means supplying fuel to the engine, a starting means, a blast air controller, a shaft, cams on the shaft for actuating the said means and the controller, certain of which are movable, a speed governor driven by the shaft for adjusting one of said cams, and a manually actuated means for adjusting another of said cams.

7. In an engine controlling mechanism, the combination of a fuel pump, a valve for controlling the amount of fuel delivered thereby, a driving shaft, a cam for driving the pump that is fixed on the shaft, a cam that is adjustable on the shaft to vary the timing of the valve, starting means, and an adjustable cam on the shaft that puts the starting means into and out of operation.

8. In an engine controlling mechanism, the combination of a starting means, a blast air controlling means, a shaft, and adjustable means driven by the shaft for actuating said starting and controlling means.

9. In an engine controlling mechanism, the combination of a fuel pump comprising a cylinder, a plunger and valves, a casing therefor, a starting valve, a casing therefor, a blast air valve, a casing therefor, a shaft and cams for actuating the plunger and valves, and a housing that is common to and supports all of the casings.

10. In an engine controlling mechanism, the combination of a fuel pump, a cam for operating it, a controlling valve for the pump, a cam for operating the valve, a shaft for the cams, a means for automatically sliding one of the cams longitudinally of the shaft, a starting means, a cam therefor, a blast air controlling means, a cam therefor, the two last named cams being driven by the shaft, and means for moving the last named cams longitudinally of the shaft.

11. In an engine controlling mechanism, the combination of fuel pumps arranged diametrically opposite, a cam that is common to and moves the plungers of both pumps, controlling means for the pumps also arranged diametrically opposite, a cam that is common to and moves both controlling means, a shaft and a governor for moving the last named cam on the shaft to control the amount of fluid delivered by the pump.

12. In an engine controlling mechanism, the combination of a fuel supply means, a starting means, a blast air controlling means, a shaft and cams for operating said means, and a device to shift the cams of the starting and blast air means independently of the fuel cams and comprising a lever, a spindle for moving it, and a locking device.

13. In an engine controlling mechanism, the combination of a fuel pump, comprising a plunger and a controlling valve, a hollow cam shaft having a slot therein, a cam fixed on the shaft for actuating the plunger, a cam adjacent the fixed cam and movable axially on the shaft for actuating the valve, and means extending through the shaft and entering the slot for moving the last named cam.

14. In an engine controlling mechanism, the combination of a fuel pump, comprising a plunger and a hollow shaft having a slot therein, a cam fixed on the shaft for actuating the pump plunger, a second cam on the shaft adjacent the first named cam and movable axially on the shaft for controlling the valve, a speed governor mounted on the shaft and responsive to the speed thereof, and means extending through the hollow shaft and projecting into said slot for operatively connecting the speed governor to the movable cam.

15. In an engine controlling mechanism, the combination of a fuel supply means, a blast air controlling means comprising a valve that is normally held open, a casing therefor, a means for balancing the valve as to fluid pressure when it is desired to close it, a spring for seating the valve, a shaft and cams for actuating the fuel supply means and also the balancing means, and means for moving the cam of the balancing means into and out of action.

16. In an engine controlling mechanism, the combination of a housing, a shaft that extends through the housing, pumps supported by the housing and located on opposite sides of the shaft, starting means supported by the housing and located on opposite sides of the shaft, a blast air controlling means supported by the housing and actuated by the shaft, cams on the shaft that act first on the parts on one side thereof and then on the other, and a means for axially adjusting certain of the cams on the shaft.

17. In an engine controlling mechanism, the combination of a fuel pump, a controlling valve therefor, a shaft, a cam thereon for actuating the pump, an adjustable cam mounted on the shaft for changing the timing of said valve, a speed governor for adjusting the cam, an air starting valve, a blast air controlling valve, cam means driven by the shaft for operating the starting and blast air valves in proper sequence, and means for adjusting said cam means independently of the speed governor to admit compressed air to the cylinder of the engine for starting and to cut off the supply of blast air to its fuel injector.

18. In an engine controlling mechanism, the combination of a fuel pump, a controlling valve therefor, a shaft, a cam thereon for actuating the pump, a cam mounted to slide on the shaft for actuating the valve, a speed governor for sliding the cam on the shaft to vary the timing of the valve, an air starting valve, a blast air controlling valve, a cam mounted to slide on the shaft for actuating the last named valves, and a manually actuated device for moving the second cam on the shaft independently of the first.

19. In an engine controlling mechanism, the combination of a fuel pump, controlling means therefor, an elastic fluid starting means, a fuel injector, a conduit supplying high pressure blast air to the injector for discharging fuel therefrom, and a valve for shutting off the supply of blast air to the injector during the starting period.

20. In an engine controlling mechanism, the combination with a fuel pump comprising a member having two parallel bores, a plunger in one of them and a suction valve and suction valve lifter in the other, of a hollow cam shaft having a slot therein, a fixed cam on the shaft for actuating the plunger, a cam adjacent the fixed cam for actuating the lifter, said cam being axially adjustable on the shaft for varying its action thereon, a speed governor on the shaft responsive to the speed thereof, and means extending through the hollow shaft and projecting into said slot for operatively connecting the governor to the axially movable cam.

In witness whereof, I have hereunto set my hand this 7th day of January, 1913.

BERNHARD KRÄMER.

Witnesses:
 HARRY LEHMANN,
 FRANZ ZRANN.